US012810081B2

(12) United States Patent
Mikutel et al.

(10) Patent No.: US 12,810,081 B2
(45) Date of Patent: Nov. 24, 2026

(54) VISUAL COLLABORATION SYSTEM AI COPILOT FOR IDEA GENERATION

(71) Applicant: Microsoft Technology Licensing, LLC, Redmond, WA (US)

(72) Inventors: Ian William Mikutel, Kirkland, WA (US); Erez Kikin-Gil, Bellevue, WA (US); Francois M Rouaix, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 557 days.

(21) Appl. No.: 18/296,309

(22) Filed: Apr. 5, 2023

(65) Prior Publication Data

US 2024/0311576 A1 Sep. 19, 2024

Related U.S. Application Data

(60) Provisional application No. 63/491,007, filed on Mar. 17, 2023.

(51) Int. Cl.

| | |
|---|---|
| ***H04L 51/02*** | (2022.01) |
| ***G06F 3/0482*** | (2013.01) |
| ***G06F 3/0484*** | (2022.01) |
| ***G06F 40/35*** | (2020.01) |
| ***G10L 15/183*** | (2013.01) |
| ***G10L 15/22*** | (2006.01) |

(52) U.S. Cl.

CPC ............ *G06F 40/35* (2020.01); *G06F 3/0482* (2013.01); *G06F 3/0484* (2013.01); *G10L 15/183* (2013.01); *G10L 15/22* (2013.01); *H04L 51/02* (2013.01); *G10L 2015/223* (2013.01)

(58) Field of Classification Search

CPC ...... G06F 40/35; G06F 3/0482; G06F 3/0484; G10L 15/183; G10L 15/22; H04L 51/02

USPC ............................................ 704/9, 231, 251

See application file for complete search history.

(56) References Cited

U.S. PATENT DOCUMENTS

| | | | |
|---|---|---|---|
| 11,431,660 | B1 | 8/2022 | Leeds |
| 2020/0066259 | A1 | 2/2020 | Cronin |

(Continued)

OTHER PUBLICATIONS

International Search Report and Written Opinion received for PCT Application No. PCT/US2024/019292, Jun. 26, 2024, 13 pages.

(Continued)

*Primary Examiner* — George C Monikang

(74) *Attorney, Agent, or Firm* — NovoTechIP International PLLC

(57) ABSTRACT

A system and method for providing a collaboration template including a brainstorming canvas to a display device of each of a plurality of participants coupled to the system, wherein the template includes a selection element configured to activate an artificial intelligence (AI) chat interface to receive a natural language command from at least one of the participants. The natural language command is received from the participant, combined with context prompts generated by a context prompt generator system to form a combined AI request, and transmitted to an AI system. In response to the natural language commands and context prompts transmitted to the AI system, a response is received from the AI system and instructions are provided to the client device of the participant to display the AI response on the brainstorming canvas of the template.

20 Claims, 13 Drawing Sheets

(56) References Cited

U.S. PATENT DOCUMENTS

| | | | | |
|---|---|---|---|---|
| 2022/0161145 | A1* | 5/2022 | Hardee | G11B 27/34 |
| 2024/0031367 | A1* | 1/2024 | Pringle | H04L 63/10 |
| 2024/0289361 | A1* | 8/2024 | Batina | G06F 16/3328 |

OTHER PUBLICATIONS

Liu, et al., "3DALL-E: Integrating Text-to-Image AI in 3D Design Workflows," Proceedings of the 2023 ACM Designing Interactive Systems Conference, Jul. 10, 2023, pp. 1955-1977.

Yuan, et al., "Wordcraft: Story Writing With Large Language Models," Proceedings of the 27th International Conference on Intelligent User Interfaces, Mar. 22, 2022, pp. 841-852.

International Preliminary Report on Patentability (Chapter I) received for PCT Application No. PCT/US2024/019292, mailed on Oct. 2, 2025, 07 Pages.

* cited by examiner

VISUAL COLLABORATION SYSTEM AI COPILOT FOR IDEA GENERATION

BACKGROUND

Recently, visual collaboration systems, such as Microsoft Whiteboard™, have been developed to allow multiple participants to participate in brainstorming sessions to develop ideas for projects in many areas of product and service development. To this end, the typical visual collaboration system provides a brainstorming canvas that allows the different participants to post their ideas and to interact with one another for product and service development. At the same time, artificial intelligence (AI) has been developed to assist users in making decisions in a variety of fields. However, there is a need for efficiently incorporating AI suggestions into visual collaboration systems.

SUMMARY

In an implementation, a visual collaboration system is provided including a processor and a machine-readable medium storing executable instructions that, when executed, cause the processor to perform operations including providing, via a collaboration template generator module, a collaboration template including a brainstorming canvas to a display device of each of a plurality of participants coupled to the system, wherein the template includes an artificial intelligence (AI) chat interface to receive a natural language command from at least one of the participants receiving, via a receiver module, the natural language command from the at least one of the participants combining, via an AI request generator module, the natural language command with context prompts generated by a context prompt generator system to form a combined AI request and transmitting the combined AI request to an AI system, in response to the combined AI request transmitted to the AI system, receiving an AI response, via an AI response receiver module, from the AI system, and in response to receiving the AI response from the AI system, instructing at least one of the display devices of the participants, via an AI response transmitter module, to display the AI response on the brainstorming canvas of the template on the display device of the at least one of the participants.

In another implementation, a whiteboard application interface is provided for a visual collaboration application including a brainstorming area to display at least one of text and images to a user of the visual collaboration application, an artificial intelligence (AI) chat interface to allow the user to enter a natural language command to an AI system, a response window interface to display an AI response by the AI system to the natural language command and to allow the user to enter selections pertaining to the AI response, wherein the selections pertaining to the AI response are displayed as at least one of text and images as notes in the brainstorming area, and a user interface (UI) window, separate from the AI chat interface, to present predefined suggestions to the user in response to the user clicking on a selected one of the notes in the brainstorming area, wherein the user's selection on one of the predefined suggestions activates a command to the AI system to provide a supplemental AI response, and wherein the supplemental response by the AI system is displayed as additional notes in the brainstorming area.

In another implementation, a visual collaboration method is provided, including providing, via a collaboration template generator module, a collaboration template including a brainstorming canvas to a display device of each of a plurality of participants coupled to the system, wherein the template includes an artificial intelligence (AI) chat interface to receive a natural language command from at least one of the participants, receiving, via a receiver module, the natural language command from the at least one of the participants, combining, via an AI request generator module, the natural language command with context prompts generated by a context prompt generator system to form a combined AI request and transmitting the combined AI request to an AI system, in response to the combined AI request transmitted to the AI system, receiving an AI response, via an AI response receiver module, from the AI system, and in response to receiving the AI response from the AI system, instructing at least one of the display devices of the participants, via an AI response transmitter module, to display the AI response on the brainstorming canvas of the template on the display device of the at least one of the participants.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

At present, although AI copilots exist for a number of different applications, as discussed above, the need exists for a technical solution to efficiently incorporate AI suggestions into visual collaboration systems. To this end, the present disclosure provides an improved system and method for interacting with a generative AI chatbot such as ChatGPT™ that is embedded into a visual, collaborative brainstorm canvas such as that provided by Microsoft Whiteboard™. An aspect includes a user experience (UX) in which the user (e.g., referred to as a participant herein) enters natural language inputs that may include sentences, questions, and descriptions, in order to generate a series of ideas that are added to the brainstorming canvas. The AI assistant may return content that includes text-based ideas as well as visual representations of ideas and effectively integrates with content from other collaborations for an improved ideation experience. The UX model provides for interaction with the AI chatbot via a chat interface as well as through on-canvas interactions according to pre-defined instructions for ideation, e.g., "suggest similar ideas." An aspect includes an architecture for an improved collaborative brainstorm canvas integrated with a generative AI chatbot such as ChatGPT™ that provides the UX model described above.

Figure 1:
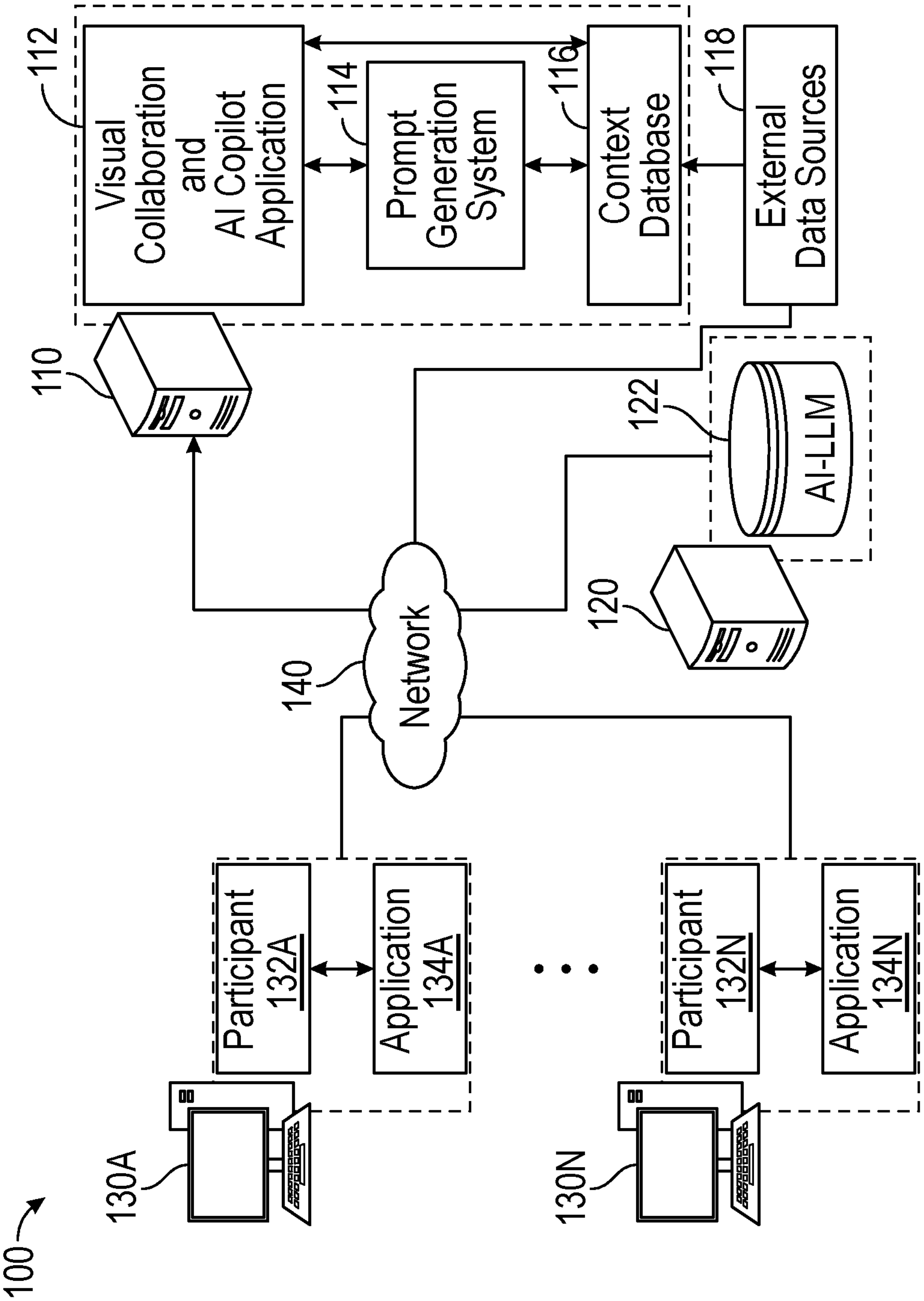
FIG. 1 depicts an example system upon which aspects of this disclosure may be implemented.

FIG. 1 illustrates an example visual collaboration system 100, upon which aspects of this disclosure may be implemented. The system 100 includes a server 110, which itself includes a visual collaboration and AI copilot application 112, a prompt generation system 114 and a context database 116 (coupled to external data sources 118 which provide inputs regarding context to be stored in the context database 116). While shown as one server, the server 110 may represent a plurality of servers that work together to deliver the functions and services provided by each engine or application included in the server 110. The server 110 may operate as a shared resource server located at an enterprise accessible by various computer client devices such as client devices 130A-130N. The server 110 may also operate as a cloud-based server for visual collaboration services for one or more applications such as application 112 and/or visual collaboration applications 134A-134N on the client devices 130A-130N. The visual collaboration applications 134A-134N allow for multiple participants 132A-132N to engage in visual collaboration with one another, via the network 140 and the server 110.

Still referring to FIG. 1, the server 110 and the client devices 130A-130N are connected to one another via a network 140, which can be a cloud network or any other type of network capable of supporting visual collaboration, as described herein, between multiple participants 132A-132N. In addition, an artificial intelligence (AI) server 120 is also connected to the network 140. This AI server 120 can include an AI large language model (LLM) 122, which is a subset of artificial intelligence that has been trained on vast quantities of text data to produce human-like responses to dialogue or other natural language inputs. As will be discussed below, the visual collaboration and AI copilot application 112 of the server 110 communicates with the AI LLM 122 to provide AI responses to commands made on the visual collaboration applications 134A-134N of the client devices 130A-130N.

Figure 2:
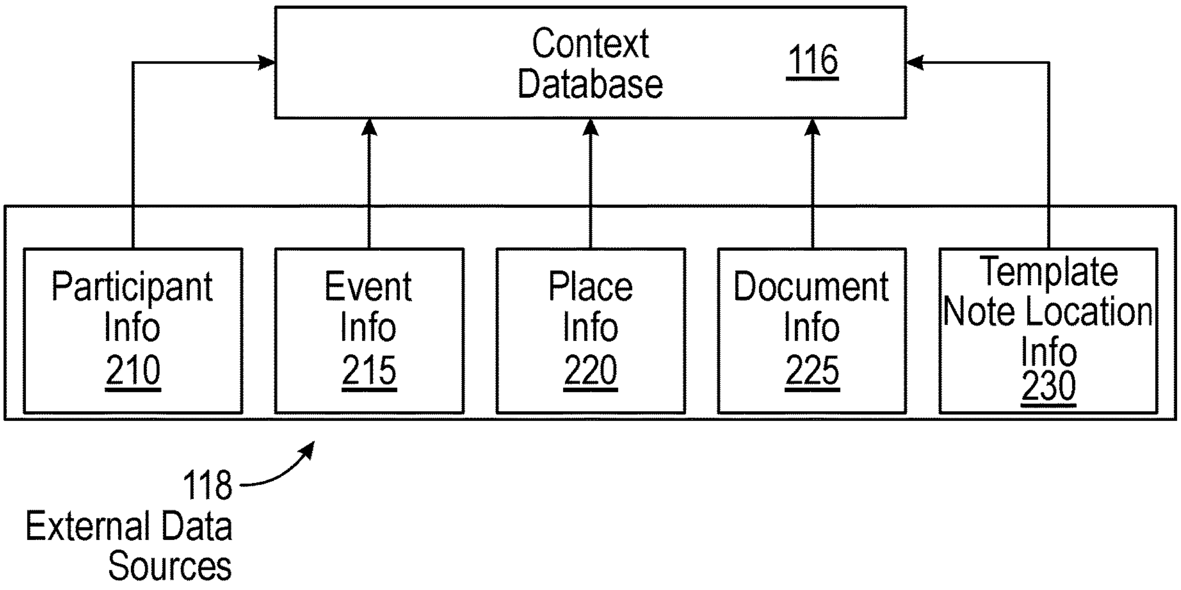
FIG. 2 depicts an example of the external data source of FIG. 1 in accordance with this disclosure.

Referring to FIGS. 1 and 2, the server 110 includes the prompt generation system 114 that generates context prompts to the application 112 based on information provided from a context database 116, which, in turns, stores context information provided by external data sources 118. As shown in FIG. 2, the external data sources 118 can include numerous types of context data from numerous sources. For example, participant information 210 can be provided by the participants 132A-132N themselves, or from information about the participants which an organization that the participants are associated with has gathered, or from social media information available to the public. This participant information 210 can include roles of the participants in an organization, personal data about the participants such as age and gender, employment history, and previous projects the participants are associated with which may be related to the project being collaborated on.

As also shown in FIG. 2, other types of context information from the external data sources 118 can include event information 215. This event information 215 can include context information regarding the type of project the collaboration is associated with (e.g., products or services). In an example which will be discussed below with regard to FIGS. 5-13, the project is related to determining slogans for running shoes. As such, the event information 215 can include details of the product in question (e.g., running shoes), such as intended product usage, product history, sales records, previous collaboration sessions regarding the product, etc. Of course, the project could involve any type of project that is the subject of the collaboration.

In addition, as shown in FIG. 2, place information 220 can be provided from the external data sources 118. This can include locations of the participants and, in particular, of the organization that is associated with the collaboration. The place information 220 can also include detailed information about the organization itself, such as plant/office locations, number of employees/members, typical markets, previous marketing data, previous related projects, sales projections, future expansion plans, affiliated organizations, governmental considerations, etc.

Still further, as shown in FIG. 2, document information 225 can be provided from the external data sources 118. This can include the types of documents that are expected to be involved in the project at hand, such as emails, text, images, etc. All of the information, that is, the participant information 210, the event information 215, the place information 220 and the document information 225 is provided to the context database 116 where it is stored for use by the prompt generation system 114. This combined stored information is received by the prompt generation system 114 where it is used to formulate prompts defining background context pertaining to the particular collaboration which is being facilitated by the interaction of the visual collaboration and AI copilot application 112 in the server 110 and the visual collaboration applications 134A-134N in the client devices 130A-130N.

In addition, the external data sources 118 can include template note location information 230 which provides data regarding the location of notes (such as those shown in FIG. 8 as notes 810) which are already on a collaboration template (such as 510 in FIG. 5) either from being previously posted by one or more of the participants 132A-132N or from previous AI recommendations (as will be discussed below with reference to FIGS. 5-13). As such, the location of previous notes can be part of context prompt information provided by the prompt generation system 114 to the visual collaboration and AI copilot application 112. In this case, a response from the AI-LLM can include recommendations for actual placement of new notes generated based on the AI response. This allows for making sure that ideas suggested by the AI-LLM 122 land in logical locations on canvases of the collaboration template when a participant selects to insert ideas received from the AI-LLM on a canvas of the collaboration template. In other words, this is an aspect of "object awareness" of AI generated ideas relative to ideas already visible on canvases of the collaboration template. This ensures that ideas (expressed, for example, as notes on a canvas of the template) are close to other related ideas, or related topics in a template header, or in sequential order of a flow diagram, or simply not overlapping with other ideas.

Alternatively, as will be discussed in further detail below, input from the context database 116 could be provided directly into a template note location organizer module 321 shown in FIG. 3 as part of the visual collaboration and AI copilot application 112 to provide previous note locations that can be used to ensure appropriate logical placement of new notes from the AI-LLM source 122 on the collaboration template. A further alternative implementation uses a note location organizer module (not shown), similar to the template note location organizer module 321, in each user's applications 134A-134N to conduct location determinations for notes after a participant 132A-132N determines which notes to add to the collaboration template, as will be discussed below with regard to FIGS. 5-13.

Figure 3:
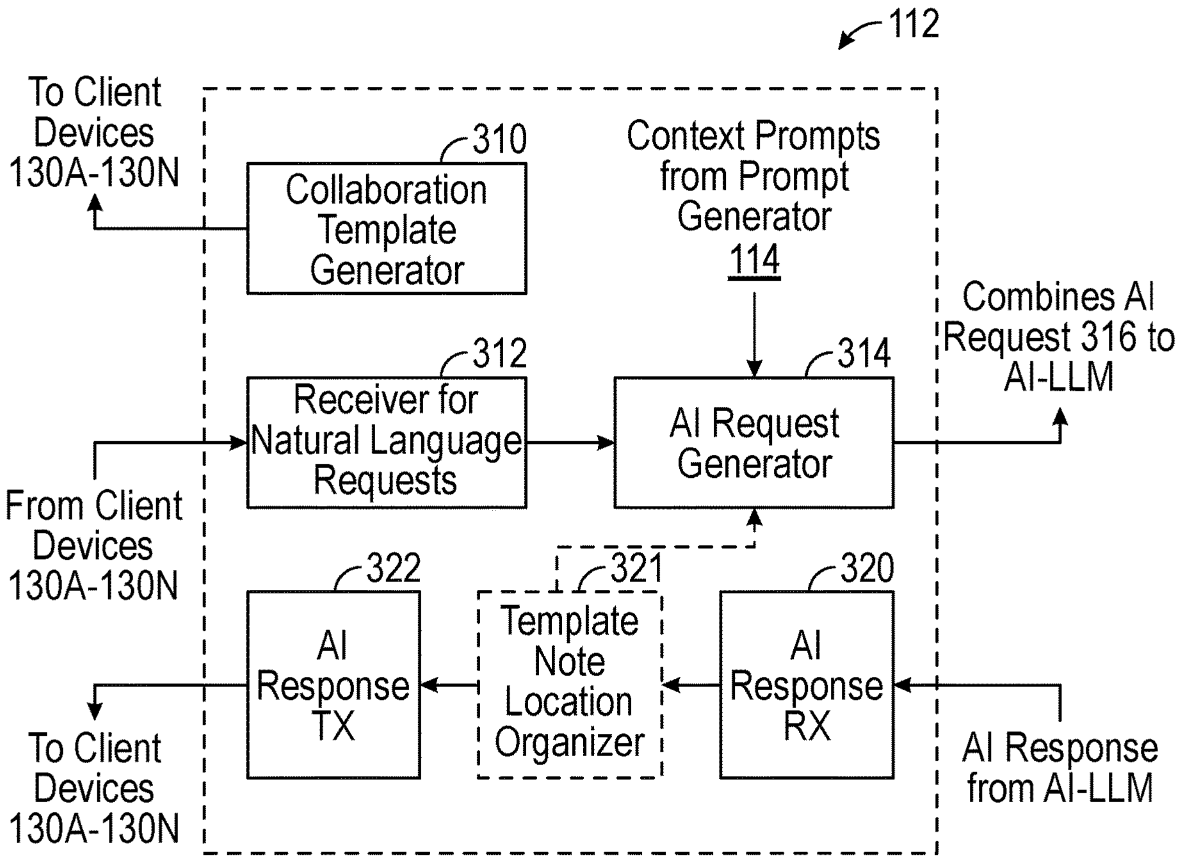
FIG. 3 depicts an example of the visual collaboration and AI copilot application of FIG. 1 in accordance with this disclosure.

Referring next to FIG. 3, the visual collaboration and AI copilot application 112 includes a collaboration template generator 310 for generating a visual collaboration template that will be displayed on the client devices 130A-130N. As will be discussed below with reference to FIGS. 5-13, the generated and displayed collaboration template includes a brainstorming canvas on a display device of each of a plurality of participants 132A-132N. The template includes a selection element (e.g., a dialog box) configured to activate an artificial intelligence (AI) chat interface (e.g., see 545 in FIG. 5) to receive natural language commands from at least one of the participants 132A-132N to be transmitted to the AI-LLM 122 of the server 120 via the network 140.

Specifically, as shown in FIG. 3, the application 112 in the server 110 includes a receiver module 312 to receive natural language requests from the client devices 130A-130N and sends these natural language requests, together with the context prompts, to the AI-LLM 122 via an AI request generator module 314 as a combined AI request 316. In other words, the AI request generator module adds the context information received from the prompt generation system 114 to the natural language requests from the participants to create the combined AI request 316. The context prompts are generated by a prompt generation system 114 which provides the context prompts to the AI request generator module 314. Responses from the AI-LLM 122 to the combined AI requests 316 are received by the application 112 in the server 110 by an AI response receiver module 320 and then sent to the visual collaboration applications 134A-134N of the participants 132A-132N as text and/or visual image responses via an AI response transmitter module 322.

As discussed above, one of the context prompts provided from the prompt generator 114 to the AI request generation 314 can be template note location information 230. This can provide information regarding the location of notes (e.g., see 810 in FIG. 8) on a collaboration template (e.g., see 510 in FIG. 5) to include in the combined AI request 316 sent to the AI-LLM 122. In one implementation, the AI response from the AI-LLM will include recommendations for the location of new notes to be posted on the collaboration template relative to one another and relative to any previously posted notes on the collaboration template.

In another implementation, a template note location organizer module 321 can receive the AI response from the AI-LLM 122 and provide recommendations for locating new information in the AI response on the collaboration template. To this end, the template note location organizer 321 can be connected to the AI request generator 314 to generate a supplemental request to the AI-LLM 122 for recommendations for note placement after the AI response with suggestions for new notes has been received, rather than the AI response including note location recommendations in an initial AI response. In yet another implementation, the template note location information 230 can be provided directly to the template note location organizer module 321 so that logical location organization can be performed in the module 321 after the AI response is received from the AI-LLM without the need for a supplemental AI request to obtain AI recommendations for the note organization.

Figure 4:
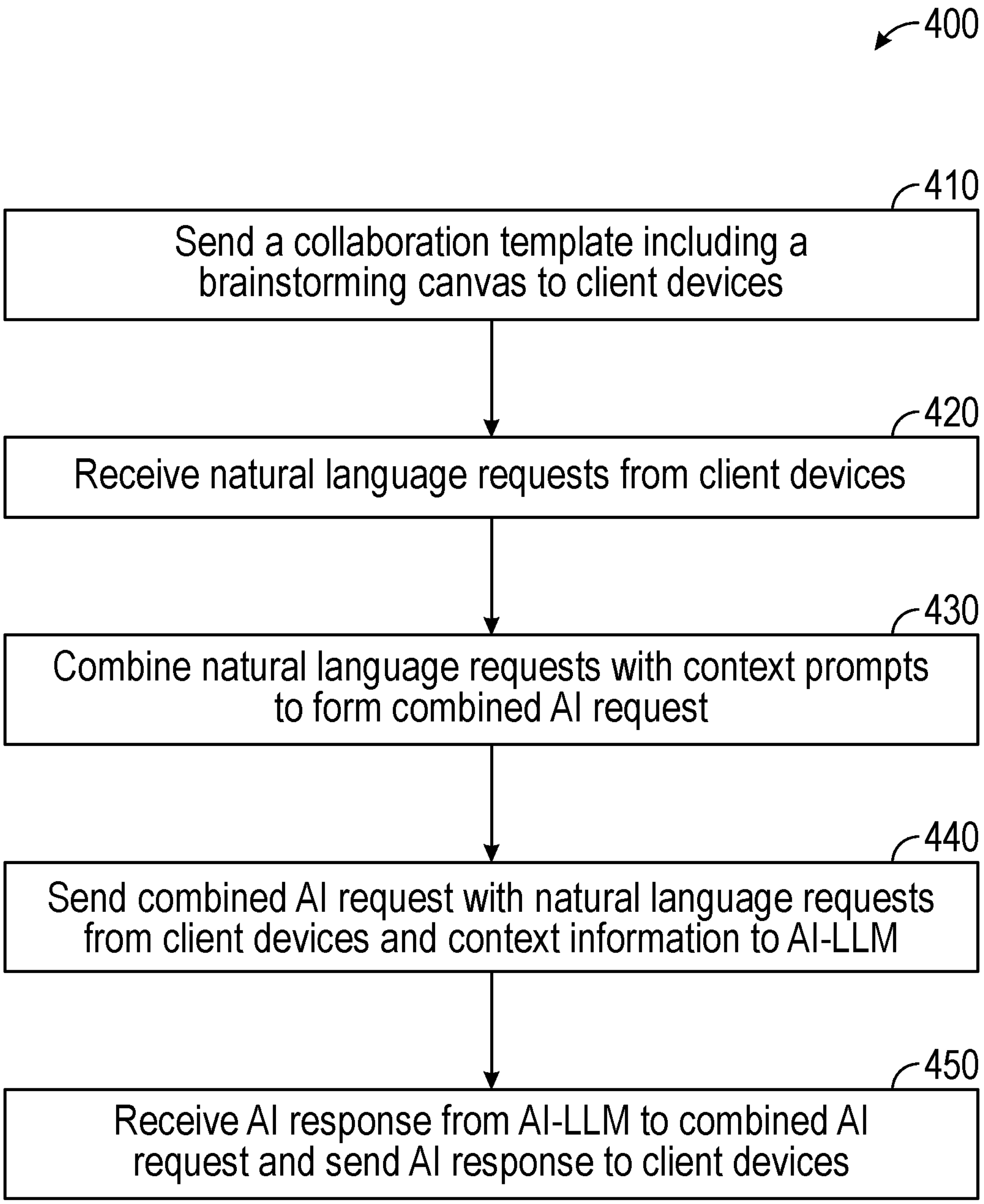
FIG. 4 depicts a flowchart of operations of the visual collaboration and AI copilot application of FIGS. 1 and 3 in accordance with this disclosure.

Referring next to FIG. 4, a flowchart 400 is shown of operations of the visual collaboration and AI copilot application 112 of FIGS. 1 and 3 in accordance with this disclosure. As shown in FIG. 4, a first step 410 of the application 112 is to send a collaboration template, including a brainstorming canvas, via a collaboration template generator 310 to the client devices 130A-130N for the participants 130A-130N to collaborate with one another via the application 112 in the server 110, and to communicate with the AI-LLM 122 via the server 110 and the network 140. As will be discussed further below, the template includes a selection element, such as a dialog box, configured to activate an artificial intelligence (AI) chat interface to receive natural language commands from at least one of the participants to be transmitted to the AI-LLM (i.e., an AI system).

In step 420 of FIG. 4, as will be described in more detail below, natural language requests are received from the client devices 130A-130N via the receiver module 312 of FIG. 3. In step 430 the received natural language requests are combined in the AI request generator 314 (see FIG. 3) with context prompts from the prompt generation system 114 of FIG. 1 to produce the combined AI request 316. This combined AI request 316 is sent to the AI-LLM 122 in step 440. Following this, the AI response from the AI-LLM 122 is received by the application 112 and then sent to the client devices 130A-130N via the receiver module 320 and transmitter module 322 of FIG. 3.

Figure 5:
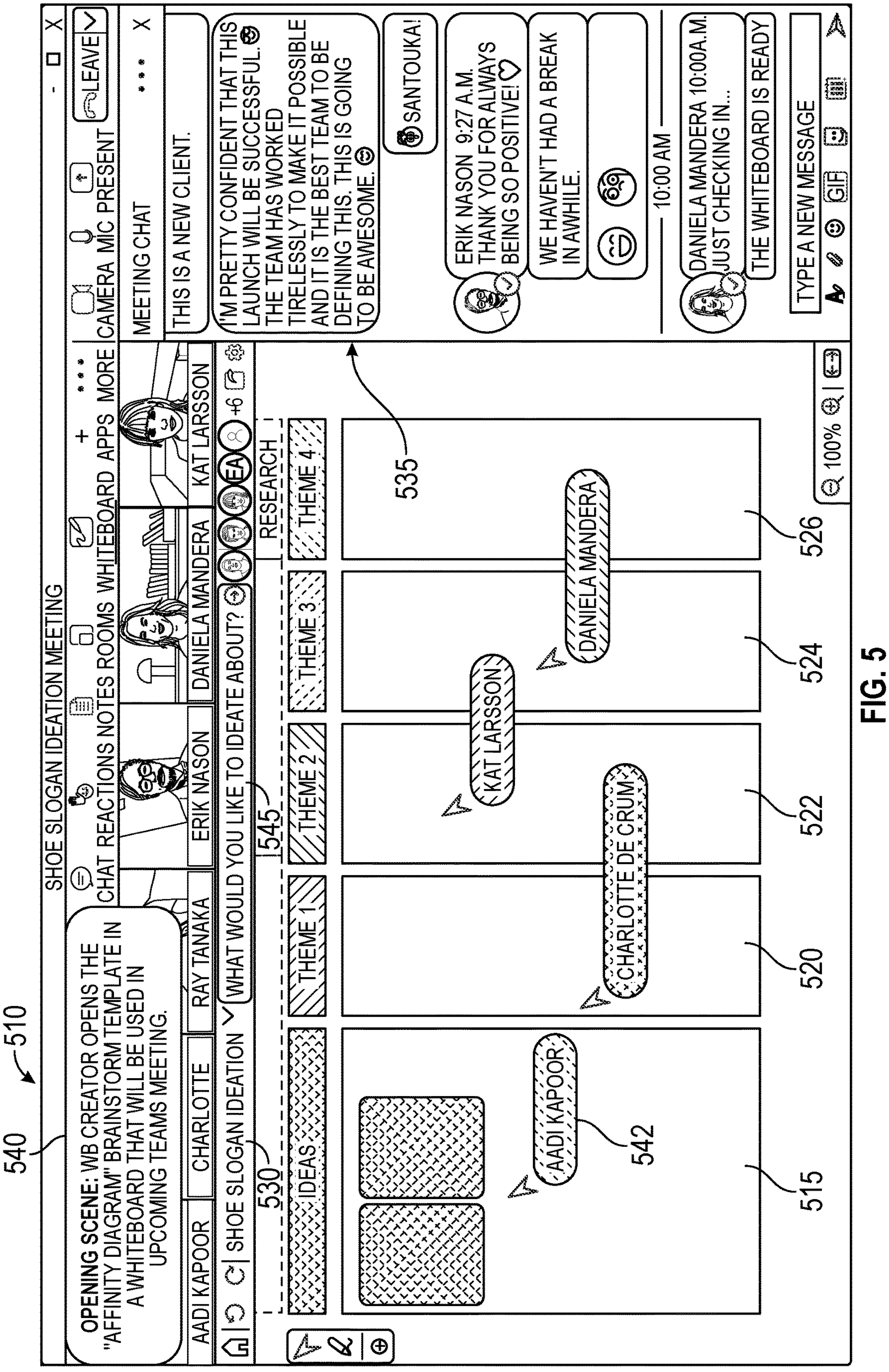
FIGS. 5-13 show example graphical user interface (GUI) screens of a visual collaboration template and AI copilot chat boxes generated on display devices of the participants by the visual collaboration and AI copilot system of FIGS. 1 and 3 in accordance with this disclosure.

Referring to FIG. 5, an example opening GUI screen displayed on a display device of one of the participants 132A of FIG. 1 is depicted. The participant 132 of FIG. 1 is using the collaboration application 134A in cooperation with the application 112 in the server 110. In FIG. 5, a collaboration template 510 is provided by the collaboration application 134A (noting that similar collaboration templates are provided for each of the other participants), which collaboration template 510 includes a brainstorming canvas 515 and theme canvases 520, 522, 524 and 526 for themes 1-4, respectively (noting that this is solely for purposes of example, and any number of theme canvases, or no theme canvas, could be provided). In FIG. 5, the project that is the subject of the collaboration is identified in a collaboration subject window 530 (in this example as "Shoe slogan ideation"). A meeting chat area 535, separate from the brainstorming canvas 515, can also be provided for communication between the collaboration participants separate from the collaboration using the brainstorming canvas. The overlay area 540 shown in FIGS. 5-13 is a descriptive area for purposes of explanation in this disclosure and is not actually part of the collaboration template 510 that a participant would actually sec.

As shown in the example of FIG. 5, which shows using Microsoft Whiteboard™ as an example of the visual collaboration applications 134A-134N shown in FIG. 1, this overlay area 540 shows that FIG. 5 illustrates an opening scene in which a visual collaboration creator (abbreviated as "WB creator") opens a brainstorming template (named an "Affinity Diagram" in Whiteboard™) that will be used in an upcoming Microsoft Teams™ meeting. Images of the participants 132A-132N are shown above the brainstorming area 515 and the theme areas 520-526, although this is optional. Also, cursor icons 542 can be shown on the template 510 for the participants so that they can actively participate in the collaboration. An AI text box 545 allows each of the participants to begin an AI request, noting that the AI text box 545 (serving as an AI chat interface) indicates "What would you like to ideate about?" It is noted that AI operation described herein is referred to as a "Whiteboard Copilot," noting that the example pertains to an example of applying the features of the present disclosure using Microsoft Whiteboard™. It is noted, of course, that the present disclosure can be utilized in other visual collaboration applications. It is also noted that the AI chat interface could include a microphone in the client devices 130A-130N to allow entry of the natural language commands verbally.

Figure 6:
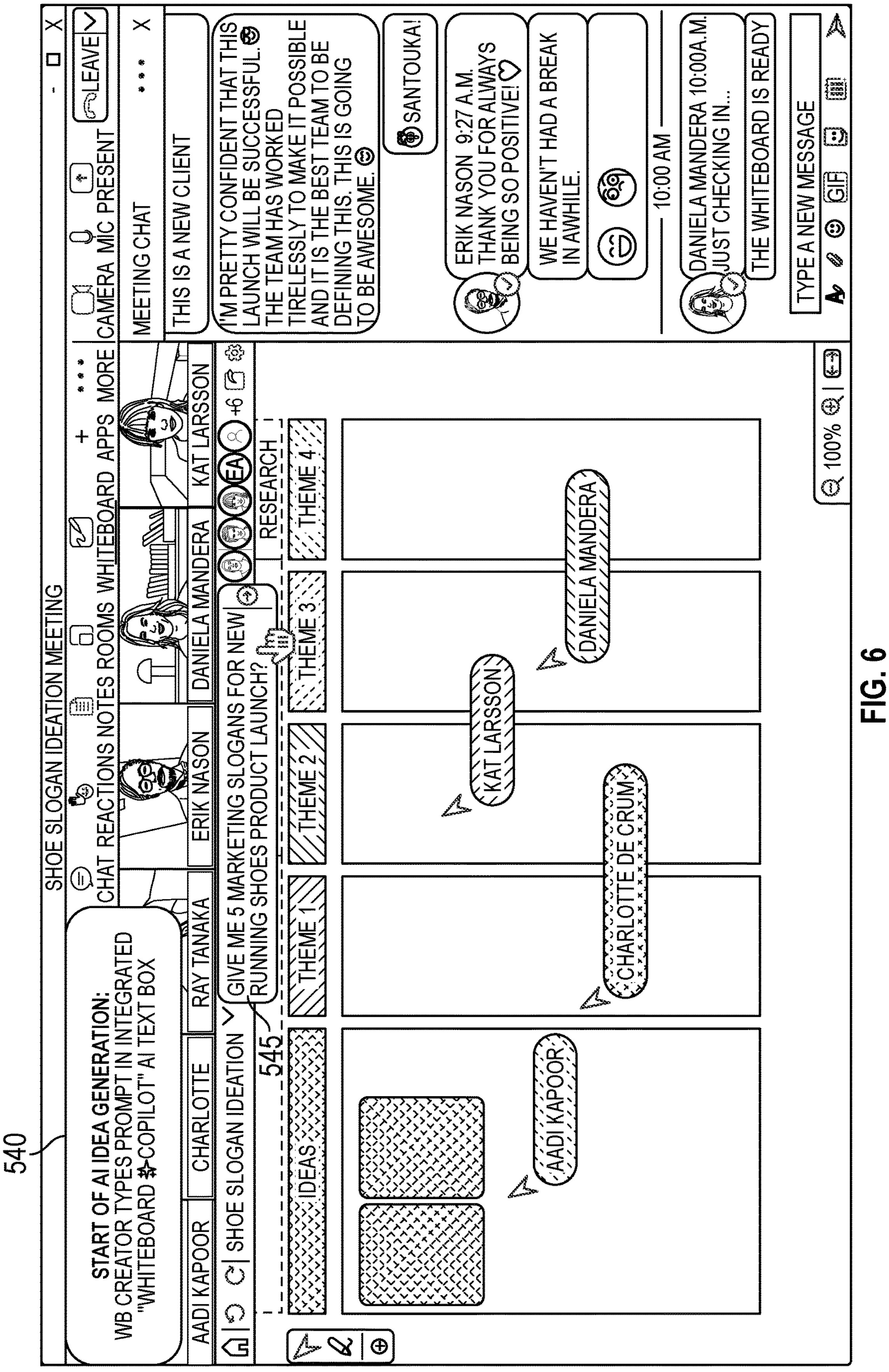

Referring to FIG. 6, the AI aspect of this disclosure begins with one of the participants (in this example, participant 132A) typing in a prompt in the AI text box 545 to request information from the AI-LLM 122. In the example shown, the participant 132A types "Give me 5 marketing slogans for new running shoes product launch?" in the AI text box 545. As noted in the overlay area 540 of FIG. 6, the typing of the request in the AI text box 545 is an initial step in an AI idea generation operation. Of course, the actual details of the request entered in the AI text box 545 depend completely on what the participant making the request is interested in. It is noted that, although the AI request is shown in this example as being entered as typed text, other forms of entry could be used such as audio commands.

Figure 7:
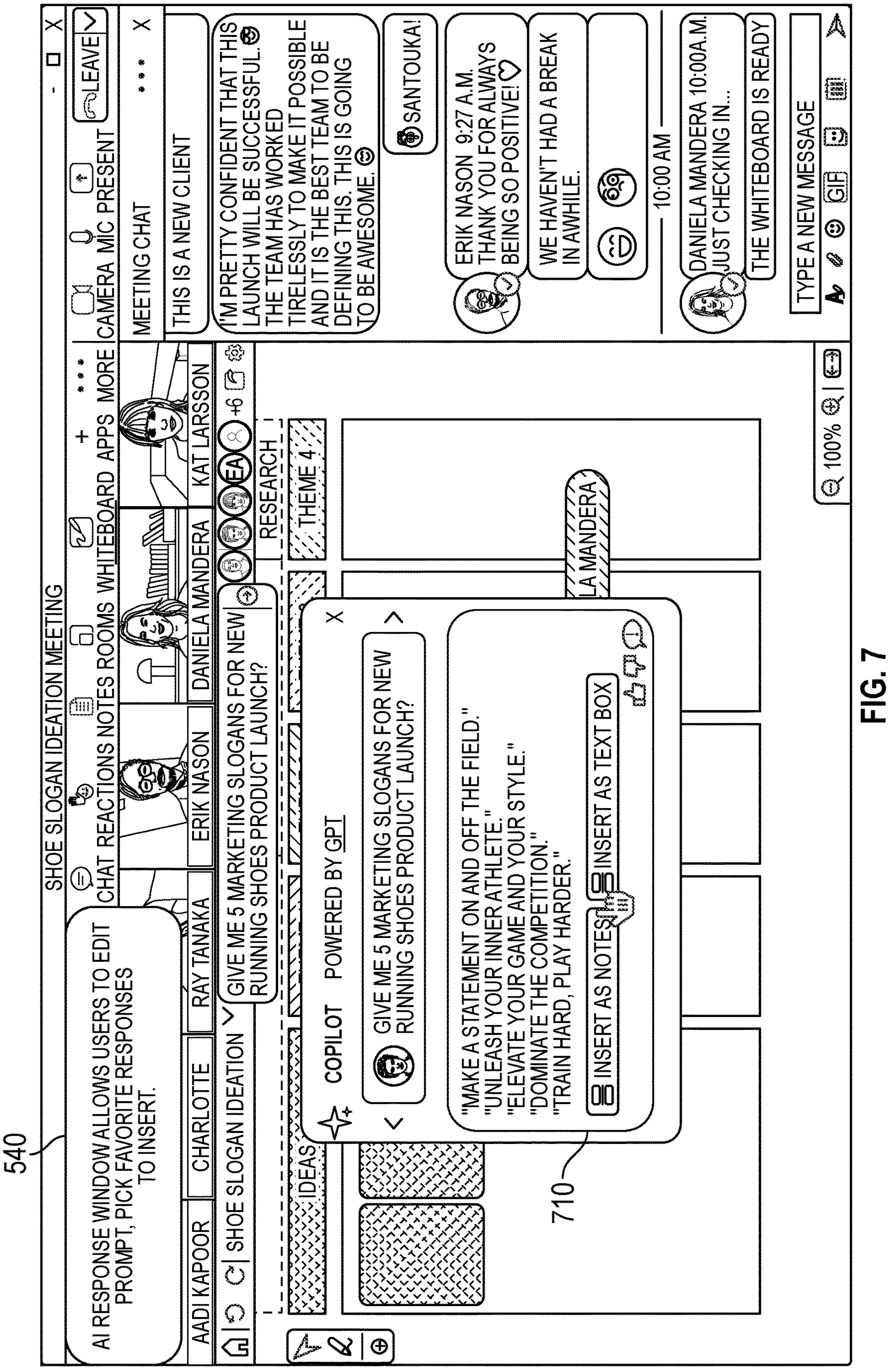

In FIG. 7, an AI response window 710 from the AI-LLM 122 is provided to the participant 132A who made the request. In the example shown in FIG. 7, the AI response is provided, using the steps discussed above with regard to FIGS. 1-4, giving the requesting participant 132A five marketing slogans. As noted in the overlay area 540, the AI response window interface 710 allows users to edit prompts and pick favorite responses to insert in the brainstorming area 515. In other words, the participant 132A can choose to place all five marketing slogans suggested in the AI response in the brainstorming area 515 (or in one or more of the theme areas 520-526), or only to place selected ones of the five in one of these areas. As can be seen, the AI response window interface 710 also gives the option of inserting the suggestions as notes (which, in the example, is what the participant is selecting) or as a text box. It is noted that, up to this point, both the request itself and the AI response window interface 710 can be private to the requesting participant (in this case 132A). However, the request and AI response can be viewed by other participants if the requesting participant prefers. For example, the template 510 can include a button (not shown) or other selection element giving each user the option of whether entries into the AI chat interface window 545, and the corresponding response from the AI system 120 are to remain private to the requesting participant or are to be available to all or at least selected ones of the other participants to the visual collaboration.

Figure 8:
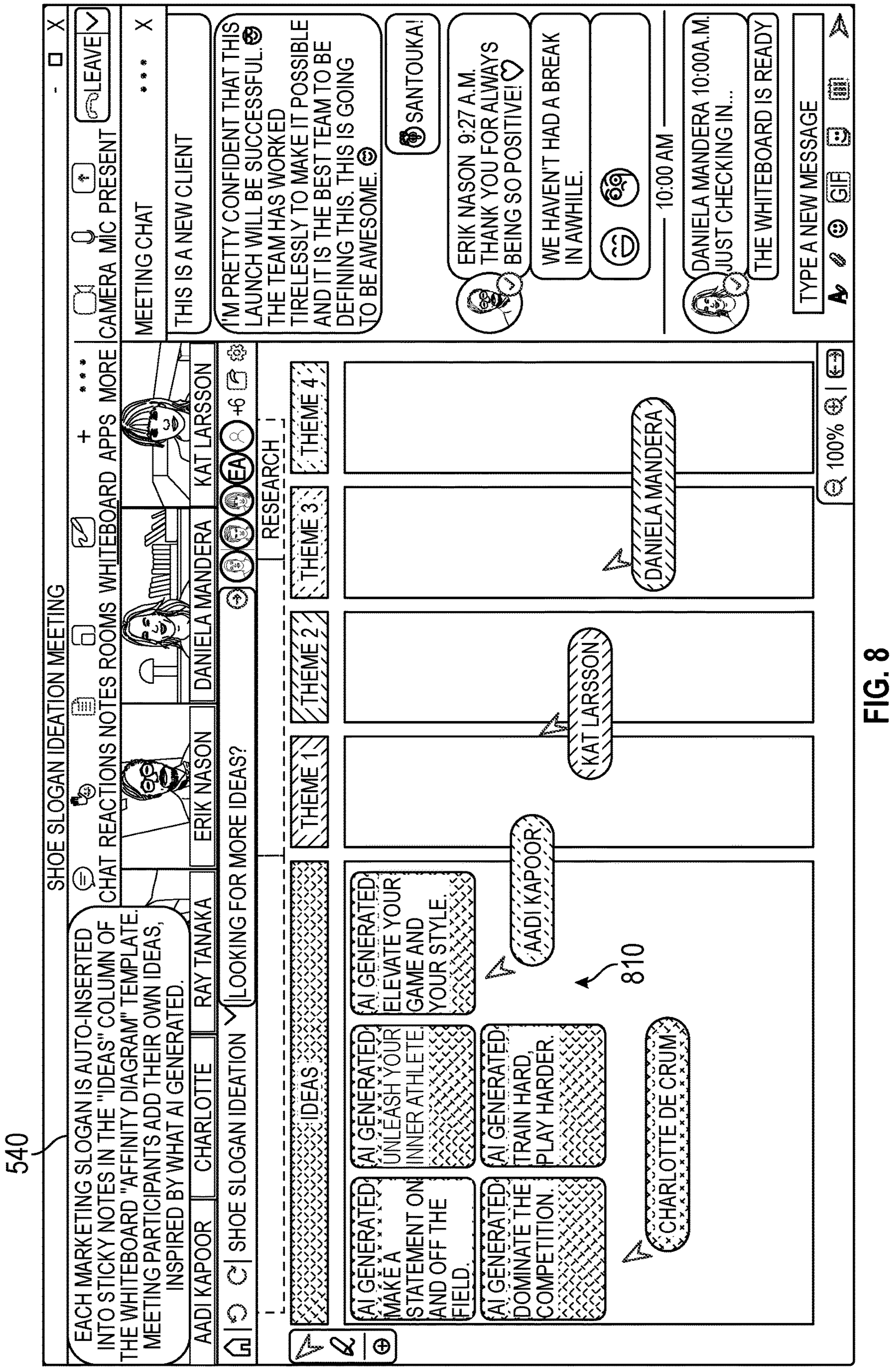

Referring next to FIG. 8, individual notes 810 (e.g., that can be made to appear as "sticky notes" for ease of working in the brainstorming area 515) are provided in response to the selections made by the requesting participant 132A in the AI response window interface 710 of FIG. 7. In the overlay area 540, it is noted that in FIG. 8 each marketing slogan from the AI response window 710 is auto-inserted as a "sticky note" in the "Ideas" column (i.e., the brainstorming area 515) of the Whiteboard "Affinity Diagram" template (i.e., the visual collaboration template 510), and, as will be discussed in the following figures, the other meeting participants add their own ideas, inspired by what the AI-LLM 122 generated and provided to the requesting participant 132A in the AI response window 710. As can be seen in FIG. 8, in this particular example, the notes 810 correspond to each of the five suggestions made by the AI-LLM 122 in the AI response. In some implementations, each of the AI suggestions is made on an individual note 810. However, if desired, the suggestions could be combined into a single note, or placed into one or more of the theme areas 520-526.

As noted above, the locations of the individual notes 810 (either in the brainstorming area 515 or one or more of the theme areas 520-526) can be controlled in a number of ways. This includes either providing the template note location information 230 in a combined AI request 316 so that the AI response includes recommendations for locating the notes 810 on the collaboration template 510. Alternatively, as discussed above, a template note location organizer module 321 can be provided either in the visual collaboration and AI copilot application 112 or in the individual applications 134A-134N to provide for organizing the notes after an AI recommendation is received by the client devices 130A-130N via the visual collaboration and AI copilot application 112. Of course, once an initial note placement is provided based on AI recommendations for such note locations, the participants 132A-132N can rearrange the note locations as desired.

Figure 9:
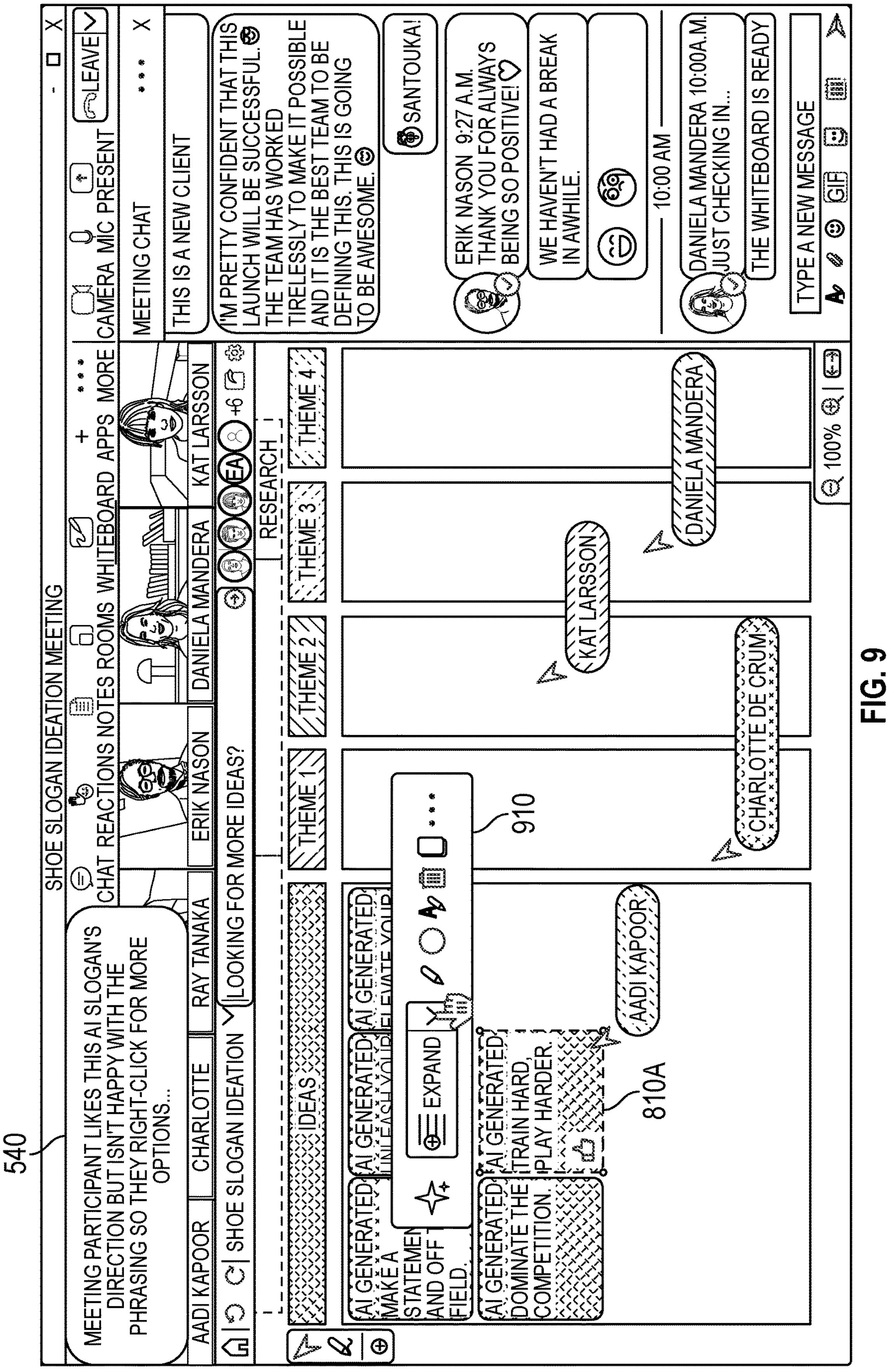

Referring next to FIG. 9, a further feature of the present disclosure is shown. Specifically, as indicated in the overlay area 540 one of the meeting participants likes the particular AI slogan "Train hard, play harder" direction on one of the notes 810*a*, but would like to explore other possible phrasing. Accordingly, the participant (who can be any one of the participants 132A-132N) right-clicks on the selected note 810*a* for more options. Specifically, right clicking on any of the notes 810 generates an on-canvas user interface (UI) element 910, separate from the AI text box 545, which allows the participant to click "expand" and "summarize" to obtain the drop-down menu 1010 shown in FIG. 10.

Figure 10:
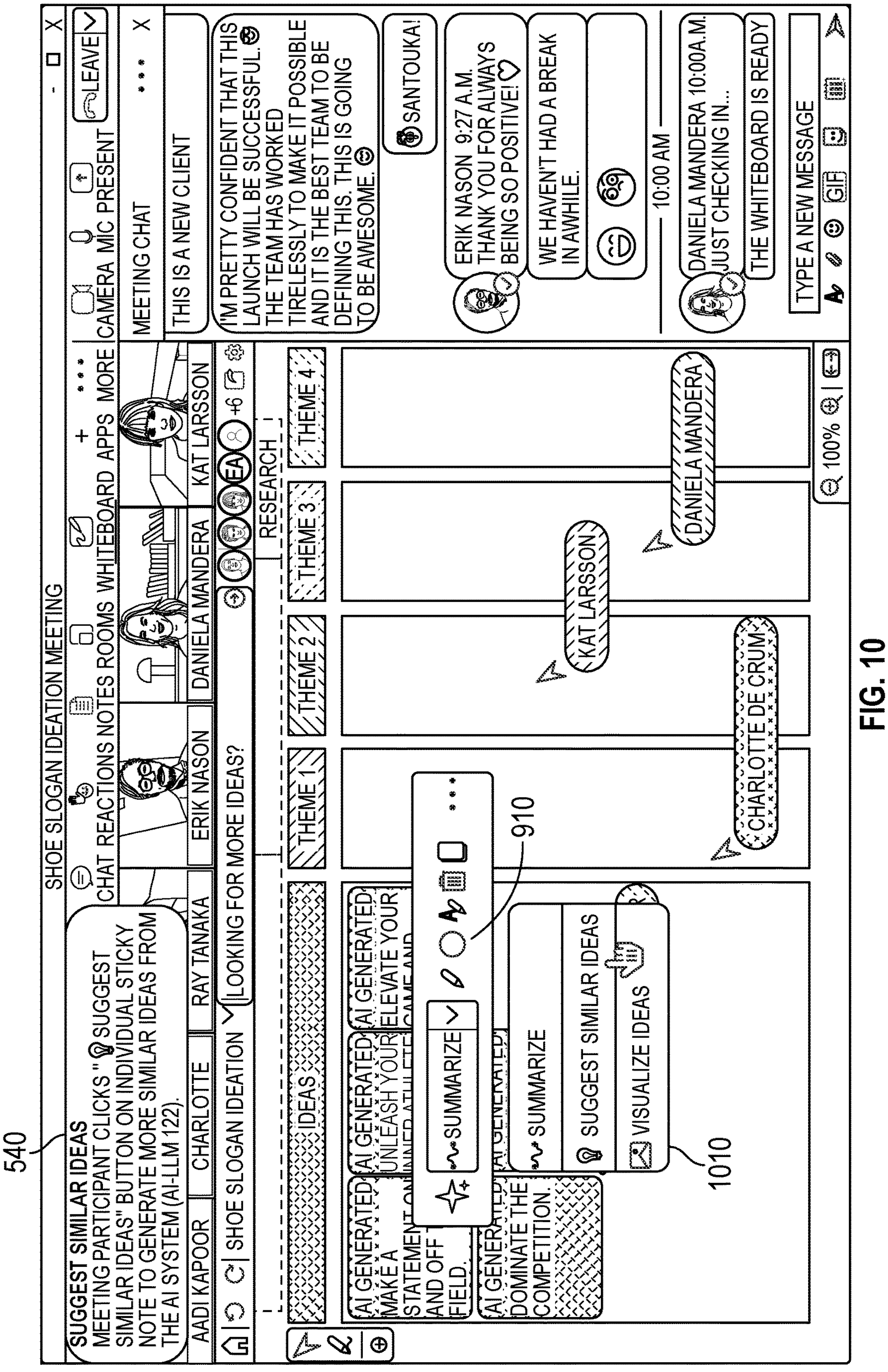

Referring to FIG. 10, the drop-down menu 1010 for "summarize" includes two predefined options of "Suggest similar ideas" to the selected sticky note 810*a*, or "Visualize ideas" regarding the selected sticky note 810*a*. An advantage of these procedures is that they allow any of the participants to focus on one of the sticky notes 810 (noting that in typical brainstorming sessions, dozens or even hundreds of sticky notes might be in the brainstorming area 515) with one-click, and then select predefined options without having to type out a request. In the example shown in FIG. 10, the selecting participant selects "Suggest similar ideas" to obtain further options from the AI-LLM 122 with regard to the selected option. This additional manner of entering AI requests significantly streamlines the interaction by the participants with the AI system (e.g., the AI-LLM 122). It is also noted that this additional UI interface process can be used to organize the notes 810, either within the brainstorming area 515 or the theme areas 520-526.

Figure 11:
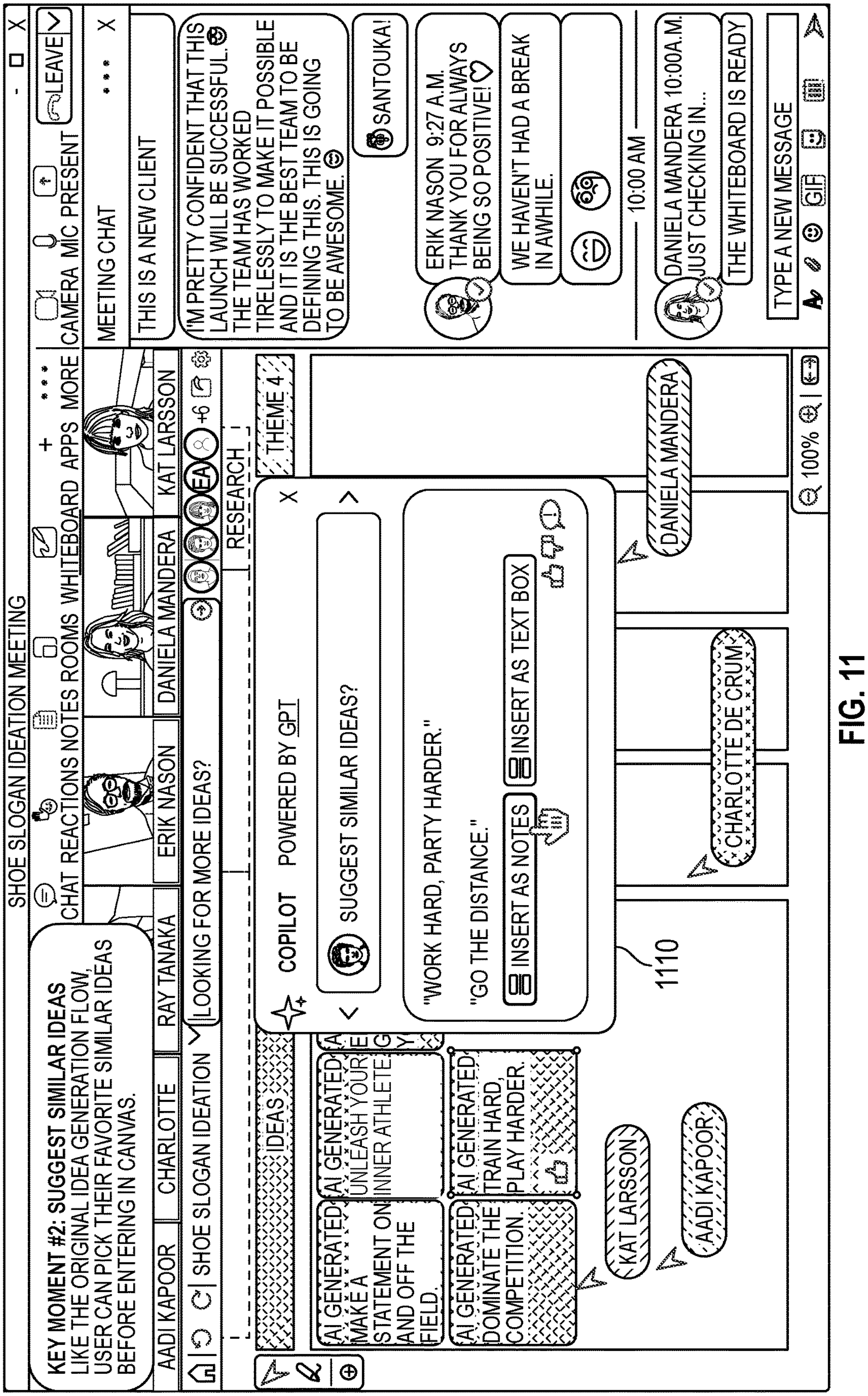
Figure 12:
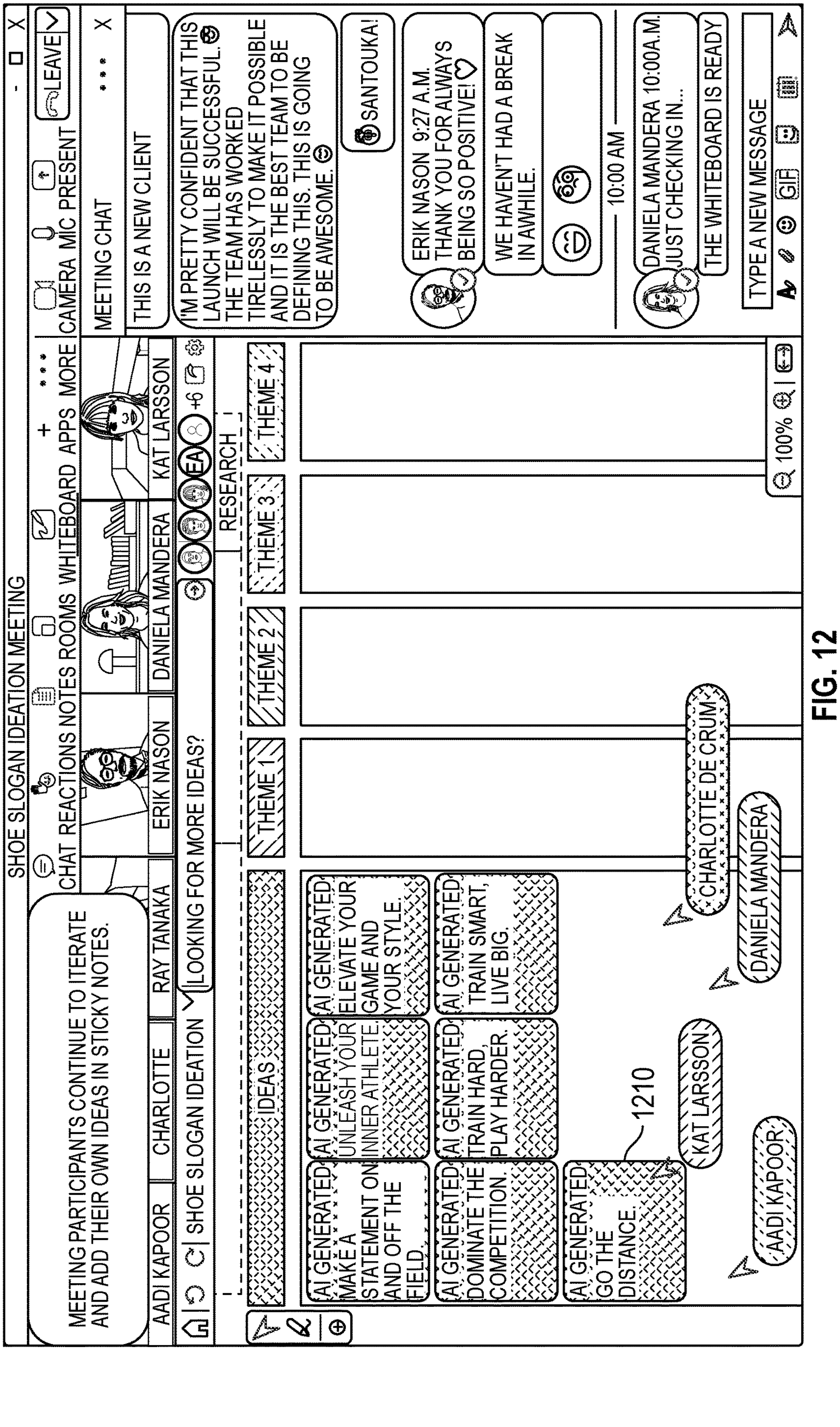
Figure 13:
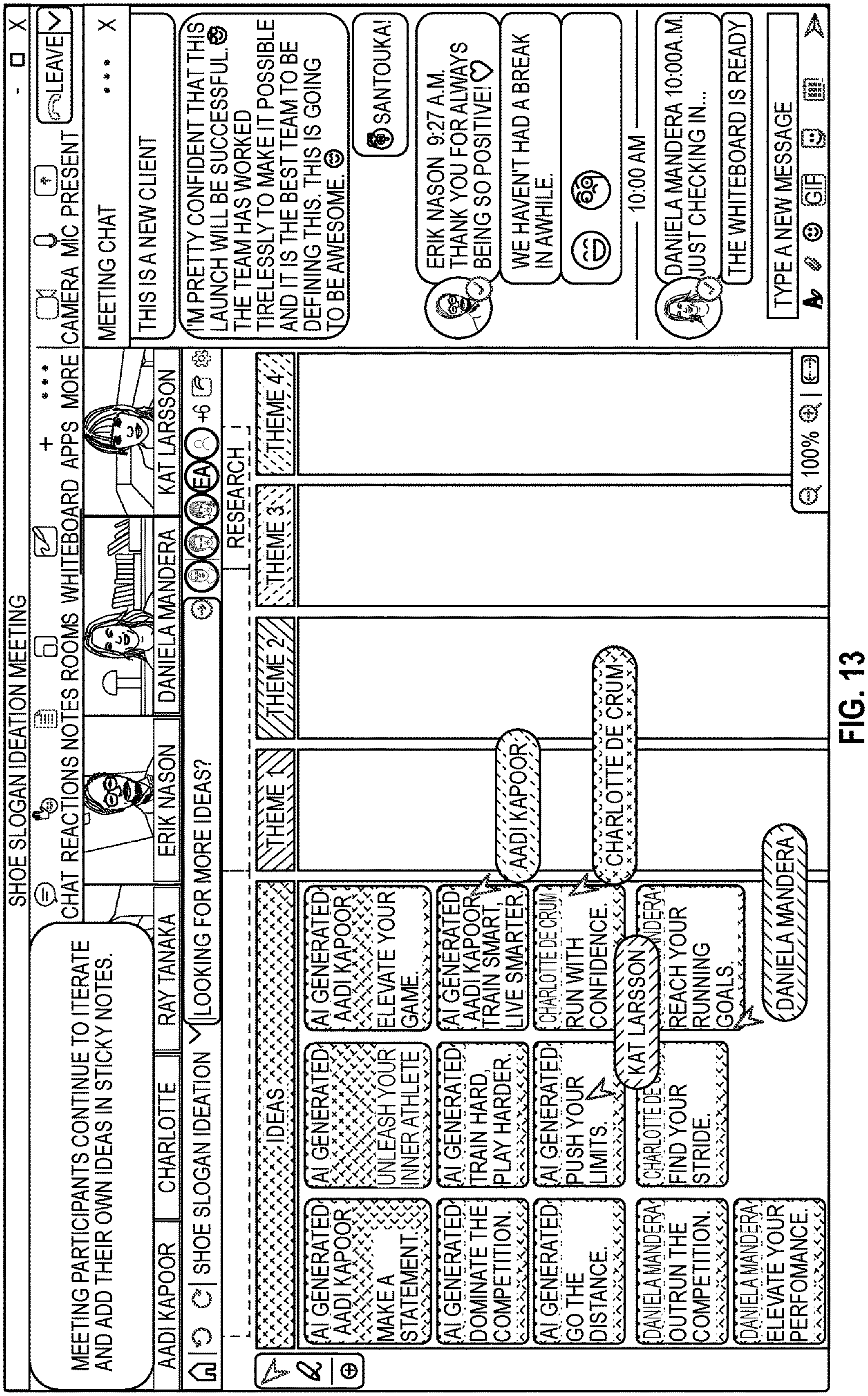

Referring next to FIG. 11, in response to the participant selecting "Suggest similar ideas" in the drop-down menu 1010, a further AI response is provided from the AI-LLM 122 in an additional AI response window 1110. As shown in FIG. 11, the additional AI response window 1110 suggests further slogans to expand on the original selected note 810*a*, specifically, "Work hard, party harder" and "Go the distance." As noted in the overlay box 540, this is another key moment in the AI interaction process because it allows the participants to expand on the original AI suggestions they found most interesting without having to utilize the AI text box 545. It is also noted that any of the participants can use this feature to expand on not only their own ideas, but also to expand on the ideas of other participants that have been added to the brainstorming area 515 either as suggestions by the AI-LLM 122 in response to AI requests of other participants or inserted as suggestions in the brainstorming area 515 by the participants themselves without utilizing the AI request process. In the example shown in FIG. 11, the participant selects inserting one of the new suggestions ("Go the distance") made by the AI-LLM 122 in the additional AI response window 1110 as an additional note to add to the brainstorming area 515 rather than entering them as a text box. FIG. 12 shows the posting of these additional note 1210 in response to the participants selections in the additional AI response window 1110. FIG. 13 shows the meeting participants 132A-132N continuing to iterate and add their own ideas as additional sticky notes, either directly on the brainstorming area 515 or via the AI suggestion process described above.

The detailed examples of systems, devices, and techniques described in connection with FIGS. 1-13 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-13 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 14:
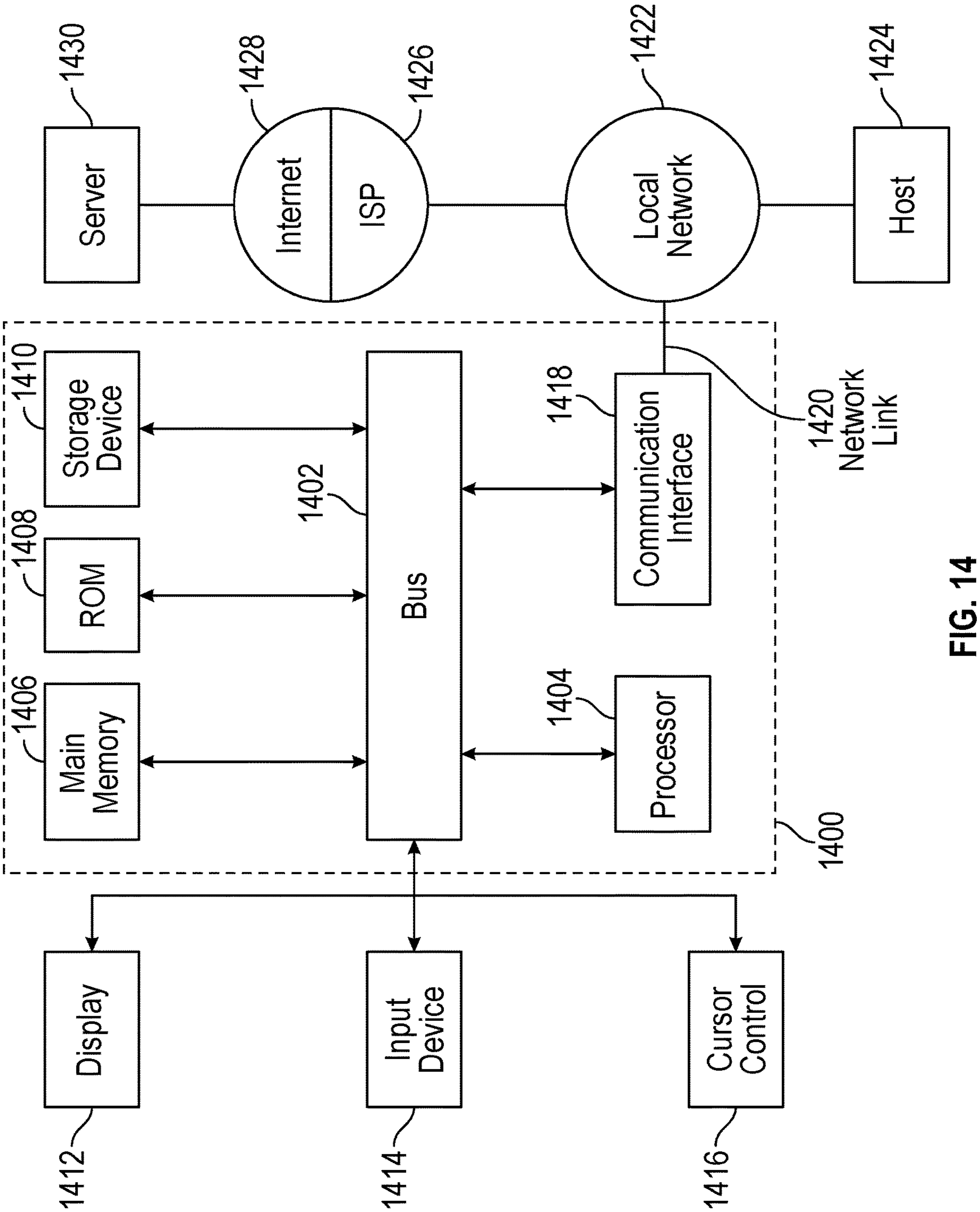
FIG. 14 is a block diagram of an example computing device, which may be used to provide implementations of the mechanisms described herein.

FIG. 14 is a block diagram showing an example a computer system 1400 upon which aspects of this disclosure may be implemented. The computer system 1400 may include a bus 1402 or other communication mechanism for communicating information, and a processor 1404 coupled with the bus 1402 for processing information. The computer system 1400 may also include a main memory 1406, such as a random-access memory (RAM) or other dynamic storage device, coupled to the bus 1402 for storing information and instructions to be executed by the processor 1404. The main memory 1406 may also be used for storing temporary variables or other intermediate information during execution of instructions to be executed by the processor 1404. The computer system 1400 may implement, for example, the visual collaboration and AI copilot system described in FIGS. 1-13.

The computer system 1400 may further include a read only memory (ROM) 1408 or other static storage device coupled to the bus 1402 for storing static information and instructions for the processor 1404. A storage device 1410, such as a flash or other non-volatile memory may be coupled to the bus 1402 for storing information and instructions.

The computer system 1400 may be coupled via the bus 1402 to a display 1412, such as a liquid crystal display (LCD), for displaying information. One or more user input devices, such as the example user input device 1414 may be coupled to the bus 1402, and may be configured for receiving various user inputs, such as user command selections and communicating these to the processor 1404, or to the main memory 1406. The user input device 1414 may include physical structure, or virtual implementation, or both, providing user input modes or options, and a cursor control 1416 for controlling, for example, a cursor, visible to a user through display 1412 or through other techniques, and such modes or operations may include, for example virtual mouse, trackball, or cursor direction keys.

The computer system 1400 may include respective resources of the processor 1404 executing, in an overlapping or interleaved manner, respective program instructions. Instructions may be read into the main memory 1406 from another machine-readable medium, such as the storage device 1410. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1410. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1400 may also include a communication interface 1418 coupled to the bus 1402, for two-way data communication coupling to a network link 1420 connected to a local network 1422. The network link 1420 may provide data communication through one or more networks to other data devices. For example, the network link 1420 may provide a connection through the local network 1422 to a host computer 1424 or to data equipment operated by an Internet Service Provider (ISP) 1426 to access through the Internet 1428 a server 1430, for example, to obtain code for an application program.

In the following, further features, characteristics and advantages of the invention will be described by means of items:

Item 1: A visual collaboration system including a processor and a machine-readable medium storing executable instructions that, when executed, cause the processor to perform operations including providing, via a collaboration template generator module, a collaboration template including a brainstorming canvas to a display device of each of a plurality of participants coupled to the system, wherein the template includes an artificial intelligence (AI) chat interface to receive a natural language command from at least one of the participants receiving, via a receiver module, the natural language command from the at least one of the participants combining, via an AI request generator module, the natural language command with context prompts generated by a context prompt generator system to form a combined AI request and transmitting the combined AI request to an AI system, in response to the combined AI request transmitted to the AI system, receiving an AI response, via an AI response receiver module, from the AI system, and in response to receiving the AI response from the AI system, instructing at least one of the display devices of the participants, via an AI response transmitter module, to display the AI response on the brainstorming canvas of the template on the display device of the at least one of the participants.

Item 2: The system of item 1, wherein the AI chat interface includes a dialog box to allow the participants to submit the natural language command via a keyboard device.

Item 3: The system of item 1 or item 2, wherein the AI chat interface includes a microphone to allow the participants to enter the natural language command verbally.

Item 4: The system of any one of items 1-3, wherein the context prompt generator system provides context to the natural language command sent to the AI system based on context information stored in a context database.

Item 5: The system of any one of items 1-4, wherein the context regards at least one of a role of at least one of the participants in an organization which the natural language command pertains to, information regarding a product or service which the natural language command pertains to, a location of the participant making the request, a location of the organization which the natural language command pertains to, information regarding the organization which the natural language command pertains to, information regarding previous events pertaining to the product or service which the natural language command pertains to, a type of a document which the natural language command pertains to, and information regarding locations of notes posted on the template to display information.

Item 6: The system of any one of items 1-5, wherein the AI system is a large language model (LLM).

Item 7: The system of any one of items 1-6, wherein the response from the AI system includes at least one of a text-based response and a visual response.

Item 8: The system of any one of items 1-7, wherein the response from the AI system generates a plurality of notes to display on the display devices of one or more of the participants.

Item 9: The system of any one of items 1-8, wherein the notes include text-based replies from the AI system.

Item 10: The system of any one of items 1-9, wherein the notes include image-based replies from the AI system.

Item 11: The system of any one of items 1-10, wherein the template further includes an on-canvas user interface (UI), separate from the AI chat interface, located on the brainstorming canvas of the template for allowing the participants to enter UI interactions using pre-defined instructions to generate additional commands to the AI system.

Item 12: The system of any one of items 1-11, wherein the response from the AI system generates a plurality of notes to display on the display devices of one or more of the participants, and the on-canvas UI is activated by clicking on one of the plurality of notes generated by the AI system response.

Item 13: The system of any one of items 1-12, wherein the pre-defined instructions include instructions to suggest additional similar ideas beyond an idea on the one of the plurality of notes, which idea has been suggested by the AI system in the AI response to the natural language commands.

Item 14: The system of any one of items 1-13, wherein natural language commands made by one of the participants are private to the one of the participants providing the natural language commands.

Item 15: The system of any one of items 1-14, wherein the instructions, when executed, cause the processor to perform a further operation comprising allowing a participant who generated the natural language command to determine which other participants will receive the AI response to the natural language command.

Item 16: A whiteboard application interface for a visual collaboration application including a brainstorming area to display at least one of text and images to a user of the visual collaboration application, an artificial intelligence (AI) chat interface to allow the user to enter a natural language command to an AI system, a response window interface to display an AI response by the AI system to the natural language command and to allow the user to enter selections pertaining to the AI response, wherein the selections pertaining to the AI response are displayed as at least one of text and images as notes in the brainstorming area, and a user interface (UI) window, separate from the AI chat interface, to present predefined suggestions to the user in response to the user clicking on a selected one of the notes in the brainstorming area, wherein the user's selection on one of the predefined suggestions activates a command to the AI system to provide a supplemental AI response, and wherein the supplemental response by the AI system is displayed as additional notes in the brainstorming area.

Item 17: The interface of item 16, further comprising a theme area, separate from the brainstorming area, to display groups of the notes displayed in the brainstorming area.

Item 18: The interface of item 16, further comprising a meeting chat interface, separate from the brainstorming area, to allow communication between the user and other users of the visual collaboration application separate from collaboration using the brainstorming area.

Item 19: A visual collaboration method including providing, via a collaboration template generator module, a collaboration template including a brainstorming canvas to a display device of each of a plurality of participants coupled to the system, wherein the template includes an artificial intelligence (AI) chat interface to receive a natural language command from at least one of the participants, receiving, via a receiver module, the natural language command from the at least one of the participants, combining, via an AI request generator module, the natural language command with context prompts generated by a context prompt generator system to form a combined AI request and transmitting the combined AI request to an AI system, in response to the combined AI request transmitted to the AI system, receiving an AI response, via an AI response receiver module, from the AI system, and in response to receiving the AI response from the AI system, instructing at least one of the display devices of the participants, via an AI response transmitter module, to display the AI response on the brainstorming canvas of the template on the display device of the at least one of the participants.

Item 20: The visual collaboration method of item 19, wherein the context regards at least one of a role of at least one of the participants in an organization which the natural language command pertains to, information regarding a product or service which the natural language command pertains to, a location of the participant making the request, a location of the organization which the natural language command pertains to, information regarding the organization which the natural language command pertains to, information regarding previous events pertaining to the product or service which the natural language command pertains to, a type of a document which the natural language command pertains to, and information regarding locations of notes posted on the template to display information.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the foregoing, detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached items and their equivalents. Also, various modifications and changes may be made within the scope of the attached items.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following items to item any and all applications, modifications and variations that fall within the true scope of the present teachings.

Unless otherwise stated, all measurements, values, ratings, positions, magnitudes, sizes, and other specifications that are set forth in this specification, including in the items that follow, are approximate, not exact. They are intended to have a reasonable range that is consistent with the functions to which they relate and with what is customary in the art to which they pertain.

The scope of protection is limited solely by the items and claims set forth herein. That scope is intended and should be interpreted to be as broad as is consistent with the ordinary meaning of the language that is used in the items and claims when interpreted in light of this specification and the prosecution history that follows and to encompass all structural and functional equivalents. Notwithstanding, none of the items or claims are intended to embrace subject matter that fails to satisfy the requirement of Sections 101, 102, or 103 of the Patent Act, nor should they be interpreted in such a way.

Except as stated immediately above, nothing that has been stated or illustrated is intended or should be interpreted to cause a dedication of any component, step, feature, object, benefit, advantage, or equivalent to the public, regardless of whether it is or is not recited in the items.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the items. In addition, in the foregoing Detailed Description, it can be seen that various features are grouped together in various examples for the purpose of streamlining the disclosure. This method of disclosure is not to be interpreted as reflecting an intention that the items require more features than are expressly recited in each item. Rather, as the following items reflect, inventive subject matter lies in less than all features of a single disclosed example. Thus, the following items are hereby incorporated into the Detailed Description, with each item standing on its own as a separately itemed subject matter.

What is claimed is:

1. A visual collaboration system comprising:

a processor; and a non-transitory machine-readable medium storing executable instructions that, when executed, cause the processor to perform operations comprising:

providing, via a collaboration template generator module, a collaboration template including a brainstorming canvas to a display device of each of a plurality of participants coupled to the visual collaboration system, wherein the collaboration template includes an artificial intelligence (AI) chat interface to receive a natural language command from at least one of the plurality of participants;

receiving, via a receiver module, the natural language command from at least one of the plurality of participants;

combining, via an AI request generator module, the natural language command with context prompts generated by a context prompt generator system, the context prompts further including template note location information that provides a location of notes already on the collaboration template, to form a combined AI request and transmitting the combined AI request to an AI system;

in response to the combined AI request transmitted to the AI system, receiving an AI response that includes a recommendation for placement of a new note on the collaboration template, via an AI response receiver module, from the AI system;

in response to receiving the AI response from the AI system, instructing the display device of at least one of the plurality of participants, via an AI response transmitter module, to display the AI response as the new note on the brainstorming canvas of the collaboration template on the display device of at least one of the plurality of participants; and providing the recommendation for placement included in the AI response to at least one of the plurality of participants on wherein the new note is to be posted on the collaboration template in a logical location relative to the location of the notes already on the collaboration template, wherein the new note is located near notes already on the collaboration template, which the AI response indicates pertain to related ideas to an idea in the new note, and the new note does not overlap any of the notes already on the collaboration template.

2. The system of claim 1, wherein the AI chat interface includes a dialog box to allow the plurality of participants to submit the natural language command via a keyboard device.

3. The system of claim 1, wherein the AI chat interface includes a microphone to allow the plurality of participants to enter the natural language command verbally.

4. The system of claim 1, wherein the context prompt generator system provides context to the natural language command sent to the AI system based on context information stored in a context database.

5. The system of claim 4, wherein the context prompt generator system receives context information that includes at least one of a role of at least one of the plurality of participants in an organization which the natural language command pertains to, information regarding a product or service which the natural language command pertains to, a location of the participant making the request, a location of the organization which the natural language command pertains to, information regarding the organization which the natural language command pertains to, information regarding previous events pertaining to the product or service which the natural language command pertains to, a type of a document which the natural language command pertains to, and information regarding locations of the notes posted on the template to display the information.

6. The system of claim 1, wherein the AI system is a large language model (LLM).

7. The system of claim 1, wherein the response from the AI system includes at least one of a text-based response and a visual response.

8. The system of claim 1, wherein the response from the AI system generates the notes to display on the display device of one or more of the plurality of participants.

9. The system of claim 8, wherein the notes include text-based replies from the AI system.

10. The system of claim 8, wherein the notes include image-based replies from the AI system.

11. The system of claim 1, wherein an on-canvas UI is activated by clicking on one of the notes generated by the AI system response.

12. The system of claim 1, wherein pre-defined instructions include instructions to suggest additional similar ideas beyond an idea on the notes, which the idea has been suggested by the AI system in the AI response to the natural language commands.

13. The system of claim 1, wherein natural language commands made by one of the plurality of participants are private to the one of the plurality of participants providing the natural language commands.

14. The system of claim 1, wherein the executable instructions, when executed, cause the processor to perform a further operation comprising allowing a participant who generated the natural language command to determine which other participants will receive the AI response to the natural language command.

15. A whiteboard application interface for a visual collaboration application comprising:

a brainstorming area to display at least one of text and images to a user of the visual collaboration application;

an artificial intelligence (AI) chat interface to allow the user to enter a natural language command to an AI system;

a response window interface to display an AI response by the AI system to the natural language command and to allow the user to enter selections pertaining to the AI response, wherein the selections pertaining to the AI response are displayed as at least one of the text and the images as notes in the brainstorming area; and a user interface (UI) window, separate from the AI chat interface, to present predefined suggestions to the user in response to the user selecting one of the notes in the brainstorming area, wherein:

the natural language command is combined with context prompts generated by a context prompt generator system, the context prompts further including template note location information that provides a location of the notes already on the whiteboard application interface, to form a combined AI request and transmitting the combined AI request to the AI system, the AI response is received in response to the combined AI request transmitted to the AI system that includes a recommendation for placement of a new note on the collaboration template, via an AI response receiver module, from the AI system;

the AI response is displayed on the response window interface as the new note on the brainstorming area of the whiteboard application interface, and the recommendation is provided for placement included in the AI response to the user on where the new note is to be posted on the whiteboard application interface in a logical location relative to the location of the notes already on the collaboration template, wherein the new note is located near notes already on the collaboration template, which the AI response indicates pertain to related ideas to an idea in the new note, and the new note does not overlap any of the notes already on the collaboration template.

16. The interface of claim 15, further comprising a theme area, separate from the brainstorming area, to display groups of the notes displayed in the brainstorming area.

17. The interface of claim 15, further comprising a meeting chat interface, separate from the brainstorming area, to allow communication between the user and other users of the visual collaboration application separate from collaboration using the brainstorming area.

18. A visual collaboration method comprising:

providing, via a collaboration template generator module, a collaboration template including a brainstorming canvas to a display device of each of a plurality of participants coupled to a visual collaboration system, wherein the collaboration template includes an artificial intelligence (AI) chat interface to receive a natural language command from at least one of the participants;

receiving, via a receiver module, the natural language command from the at least one of the participants;

combining, via an AI request generator module, the natural language command with context prompts generated by a context prompt generator system, the context prompts further including template note location information that provides a location of notes already on the collaboration template, to form a combined AI request and transmitting the combined AI request to an AI system;

in response to the combined AI request transmitted to the AI system, receiving an AI response that includes a recommendation for placement of a new note on the collaboration template, via an AI response receiver module, from the AI system;

in response to receiving the AI response from the AI system, instructing at least one of the display devices of the plurality of participants, via an AI response transmitter module, to display the AI response as the new note on the brainstorming canvas of the collaboration template on the display device of at least one of the plurality of participants; and providing the recommendation for placement included in the AI response to at least one of the participants on where the new note is to be posted on the collaboration template in a logical location relative to the location of the notes already on the collaboration template, wherein the new note is located near notes already on the collaboration template, which the AI response indicates pertain to related ideas to an idea in the new note, and the new note does not overlap any of the notes already on the collaboration template.

19. The visual collaboration method of claim 18, wherein the context prompt generator system receives context information that includes at least one of a role of at least one of the participants in an organization which the natural language command pertains to, information regarding a product or service which the natural language command pertains to, a location of a participant making a request, a location of the organization which the natural language command pertains to, information regarding the organization which the natural language command pertains to, information regarding previous events pertaining to the product or the service which the natural language command pertains to, a type of a document which the natural language command pertains to, and information regarding locations of the notes posted on the template to display the information.

20. The visual collaboration method of claim 18, wherein an on-canvas UI is activated by clicking on one of the plurality of notes generated by the AI system response.

* * * * *